United States Patent

Ohishi et al.

[11] 4,387,979
[45] Jun. 14, 1983

[54] COPYING OPTICAL SYSTEM

[75] Inventors: Michiro Ohishi, Hatoyama; Ryota Ogawa, Kawagoe; Yasunori Arai, Asaka, all of Japan

[73] Assignee: Asahi Kogaku Kogyo Kabushiki Kaisha, Tokyo, Japan

[21] Appl. No.: 242,737

[22] Filed: Mar. 11, 1981

[30] Foreign Application Priority Data

Mar. 24, 1980 [JP] Japan .................................. 55-37289

[51] Int. Cl.³ .................... G03G 15/00; G03G 15/30
[52] U.S. Cl. ...................................... 355/3 R; 355/8; 355/11; 355/46; 355/60
[58] Field of Search ................ 355/3 R, 8, 11, 24, 355/26, 46, 47, 57, 60

[56] References Cited

U.S. PATENT DOCUMENTS

| 3,519,344 | 7/1970 | Clark et al. | 355/46 X |
| 3,936,171 | 2/1976 | Brooke | 355/26 X |
| 4,008,958 | 2/1977 | Kingsland | 355/11 X |
| 4,029,409 | 6/1977 | Spinelli et al. | 355/11 X |
| 4,324,484 | 4/1982 | Johnson | 355/5 |

Primary Examiner—Fred L. Braun
Attorney, Agent, or Firm—Sughrue, Mion, Zinn, Macpeak and Seas

[57] ABSTRACT

A copying machine of the type in which an original image is formed as a visible image on a first drum and the visible image from the first drum is transferred as a secondary original image to a second drum from which multiple copies are made. A single lens system is used both to transfer the image from the original document to the first drum and transfer repeatedly the image on the first drum to the second drum thereby greatly reducing the number of optical components required in the system.

8 Claims, 8 Drawing Figures

COPYING OPTICAL SYSTEM

BACKGROUND OF THE INVENTION

The present invention relates to an improved optical system for copying machines in which an original image is formed only once into a visible image on a light sensitive drum, the visible image is used as a secondary original which is focused on another light sensitive drum, the focused image is transferred to a paper or a film after processes such as development, and a number of copies can be produced at a high speed.

Various optical systems in which a number of copies can be obtained with one scanning operation of the original have been proposed. There has been proposed one system in which two light sensitive drums are used. This system will be described briefly.

FIG. 1 is a schematic view of a prior art copying optical system of this type. An original $\overline{O}$ is illuminated by an illumination device $F_1$ and is projected onto a first drum $D_1$ by an ordinary copying optical system including a mirror M and a lens $L_1$. The first drum $D_1$ is charged in advance. When projected, the image is formed as an electrostatic latent image on the first drum $D_1$. Then, the image is developed as a visible image. Until a required number of copies are obtained, the visible image is used as a secondary original. The thus formed visible image is illuminated by a second illumination device $F_2$ disposed close to the first drum $D_1$ and is focused and projected on a second drum $D_2$ through a lens $L_2$ of a second optical system as a secondary original image. Also, the second drum $D_2$ is charged in advance and the image thereon is developed and transferred onto a paper or a film thereby obtaining copies. The path from the first drum $D_1$ to the second drum $D_2$ is hereinafter referred to as a second optical path.

As described above, in the prior art two-drum type copying machine, separate lenses, convergent fibers and mirrors are used in the first and second optical paths, respectively. In this prior art optical system there are disadvantages in that two generally expensive lenses are required, the number of mechanical parts which are used to mount the lenses is great and the machining processes therefore are accordingly numerous, and the adjustment of the drums and optical parts is complicated thereby resulting in a high manufacturing cost.

SUMMARY OF THE INVENTION

In accordance with the invention, there is provided a copying machine in which an original image is formed as a visible image on a first drum and the visible image is used as a secondary image which is focused on a second drum and transferred from the second drum to a recording sheet to thereby provide copies. A single projecting lens is used commonly in a first optical path through which the original image is projected onto the first drum and in a second optical path through which the secondary image is projected onto the second drum. In one case, an even number of mirrors is disposed up to the first drum in the first optical path and an odd number of mirrors is disposed from the first drum to the second drum in the second optical path. Otherwise, an odd number of mirrors can be disposed up to the first drum in the first optical path and an even number of mirrors disposed from the first drum to the second drum in the second optical path.

DESCRIPTION OF THE PREFERRED EMBODIMENTS

A copying optical system according to the present invention will now be described. FIGS. 2, 3, 4 and 5 show embodiments of copying optical systems according to the present invention. These are all directed to original movable copying optical systems but the present invention is applicable to original-fixed copying optical systems.

Figure 1:
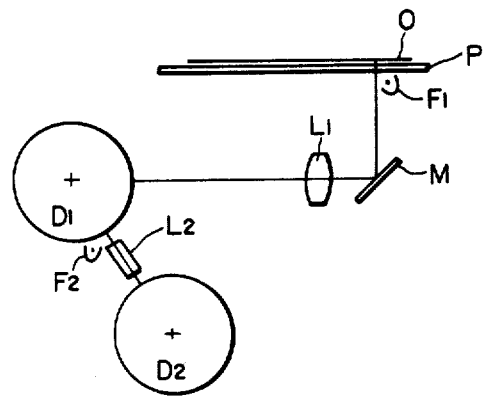
FIG. 1 is a schematic view of a prior art copying optical system for two-drum type copying machines.
Figure 2:
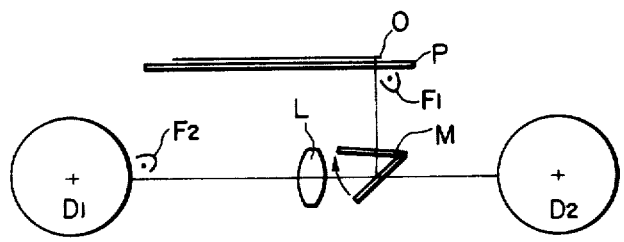
FIGS. 2, 3, 4 and 5 are each a structural view of embodiments of a copying system according to the present invention.

FIG. 2 shows an embodiment in which a single mirror is used. The original image $\overline{O}$ on the original document is disposed on an original document plate P. The original image, illuminated by an illumination device $F_1$ in a first optical path is reflected by a mirror M, a reflex surface of which is directed to a middle position between the original $\overline{O}$ and a lens L, and is focused and projected on the first drum $D_1$ by the lens L. The first drum $D_1$ is in advance processed by charging to produce an electrostatic latent image which is a visible image. In the second optical path, the visible image is used as a secondary original. The secondary original is illuminated by a second illumination device $F_2$ disposed close to the first drum $D_1$ and the image therefrom passes in the opposite direction to the first optical path. At this time, the mirror M is raised and the secondary original image is directly focused onto a second drum $D_2$ to thereby produce an electrostatic latent image on the second drum $D_2$ charged in the same manner as the first drum $D_1$. The image is developed and transferred onto paper to thereby obtain the desired copy. As may be readily appreciated, this optical system has a small number of optical parts.

Figure 3:
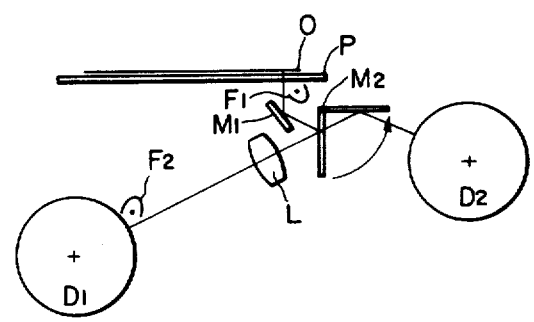

FIG. 3 shows an embodiment in which two mirrors are used. In the same way as in the optical system shown in FIG. 2, an image of the original illuminated by an illumination device $F_1$ is directed downwardly by a mirror $M_1$ and then is directed by a mirror $M_2$ to a lens L disposed obliquely downwardly and is focused on a first drum $D_1$ by the lens L. An explanation of the process from focusing to forming a visible image is not here given as it is the same as above. The visible image on the first drum $D_1$ is illuminated by the illumination device $F_2$ and passes through the lens L to the mirror $M_2$. At this time, the mirror $M_2$ is disposed so that the reflecting surface thereof is directed downwardly, which is different from the position at the first optical path, and the image is reflected to the second drum $D_2$ disposed obliquely downwardly. The process by which the focusing of the image on the drum $D_2$ is carried out and the way in which copies can be obtained is the same as above. This embodiment is notable in that the distance between the drums is shortened so that the copying machine can be made very compact.

Figure 4:
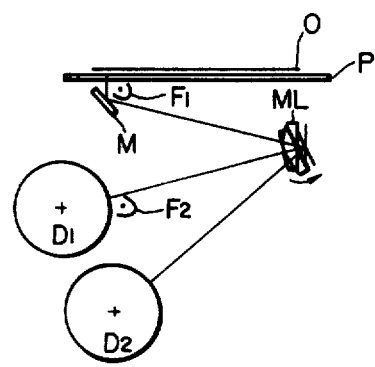

FIG. 4 shows an embodiment in which a mirror lens ML is used. In the first optical path, the original image is illuminated by an illumination device $F_1$. The illuminated original image is reflected by a mirror M directed to the middle position between the original $\overline{O}$ and a mirror-lens ML, passes through the mirror lens ML and is reflected by a mirror of the mirror lens ML, and is then focused onto a first drum $D_1$. It is to be noted that the light entering the mirror lens ML and the light reflected therefrom is equiangularly divided by a central symmetrical axis of the mirror-lens ML. In the second optical path, a visible image on the first drum $D_1$ is illuminated by an illumination device and the image strikes the mirror-lens ML at a position turned slightly downwardly in comparison with the mirror lens position in the first optical path. Also in the case of the second optical path, the symmetrical center axis of the mirror-lens ML is directed to the middle position between the first drum $D_1$ and the second drum $D_2$ so that the incident angle is equal to the reflecting angle as is the case with the first optical path. The light exiting the mirror lens ML is focused on the second drum $D_2$ to thereby obtain copies as desired. A specific feature of this embodiment is the use of the mirror-lens ML in the optical system to thereby reduce the necessary movement of the movable parts.

Figure 5:
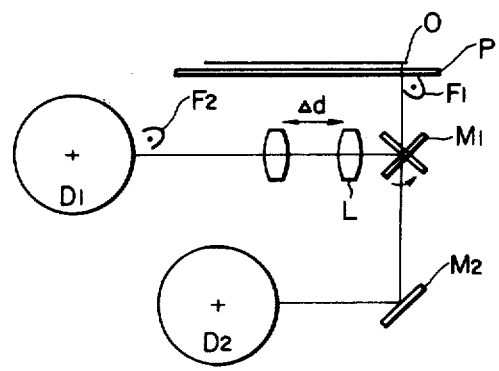

FIG. 5 shows an embodiment in which two mirrors are used. Light from the original image of the original document laid on the original document $\overline{O}$ plate P is reflected to a lens L by a mirror $M_1$ whose reflecting surface is directed to the middle position between the original document $\overline{O}$ and the lens L. The original image is focused and exposed on a first drum $D_1$ by the lens L and is formed as an electrostatic latent image on the circumferential surface of the first drum $D_1$ which was charged in advance. The image on the first drum is developed and becomes a visible image. The optical path from the original document to the first drum $D_1$ is referred to as the first optical path as mentioned above. The visible image is referred to as a secondary original image. The secondary original image on the circumferential surface of the first drum $D_1$ is illuminated by an illumination device $F_2$ disposed in the vicinity of the first drum $D_1$. Light reflected from the surface of the first drum $D_1$, that is, the secondary original image, advances oppositely to the entry direction of the first optical path and reaches the lens L and the mirror $M_1$. A reflecting surface of the mirror $M_1$ is directed to the middle position between the first drum $D_1$ and a second drum $D_2$ so that the light rays are reflected toward a mirror $M_2$ disposed therebelow. The mirror $M_2$ is arranged so that the light is reflected toward the second drum $D_2$. The second original image is focused on the second drum $D_2$. The second drum $D_2$ is also charged in advance and a disposed and developed toner image is further transferred to a paper or a film to thereby obtain copies. As described above, the first optical path from the mirror $M_1$ through the lens L to the first drum $D_1$ and the second optical path from the first drum $D_1$ through the lens L to the mirror $M_1$ are identical with each other. This makes it possible to obtain the same effect as the prior art optical system while using only one set of optical components. Thus, since common optical components are used in the two optical paths according to the optical system of the present invention, the total machine cost is reduced including the costs of assembly and adjustment.

In reference to FIGS. 6 and 7, characteristics of odd or even numbers of the mirrors used in the first and second optical path will now be described. An inverted image or a reversed image can be used as a visible image on the first drum $D_1$. It is sufficient that a copy image C transferred to the paper by the second drum $D_2$ be a normal image. Accordingly, an odd number and an even number of mirrors can be used in the first optical path. In order to obtain a normal copy image, it is required that the number of the mirrors used in the second optical path be even when the number of mirrors used in the first optical path is odd, whereas it is required that the number of mirrors used in the second optical path be odd when the number of the mirrors used in the first optical path is even.

Figure 6:
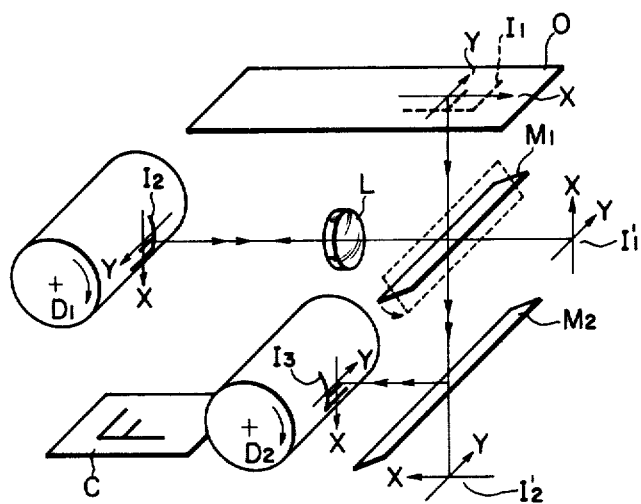
FIGS. 6 and 7 are illustrations of optical system characteristics based on odd and even numbers of mirrors.
Figure 7:
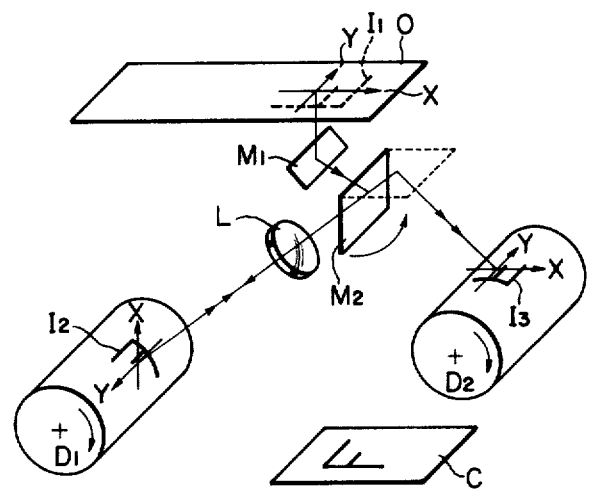

FIG. 6 is an illustration of characteristics for odd or even numbers of the mirrors used in the second optical path. In the surface of the original image $I_1$ there are X- and Y-axes as shown. The directions of the arrows indicate positive direction of axes. Since the coordinates of the original image $I_1$ are seen through the reflection at the mirror $M_1$ as viewed from the position of the lens L as if they were located at the position $I_1'$, the positive direction of the X-axis is in the upper direction as shown and the positive direction of the Y-axis is in the rearward direction as shown. Since the original image $I_1$ can be replaced by the virtual image $I_1'$, if the virtual image $I_1'$ is focused by the lens L, on the first drum $D_1$, the positive direction of the X-axis is directed downwardly and the positive direction of the Y-axis is frontwardly. The image on the first drum $D_1$ is developed to produce a visible image which is referred to as the secondary original image $I_2$. In case the secondary original image is focused on the second drum $D_2$, the mirror $M_1$ is rotated counterclockwise by 90°. The secondary original image $I_2$ is projected to be indicated by the same coordinates as those of the above noted virtual image $I_1'$ at the position of the virtual image $I_1'$. However, since at this time the mirror $M_1$ is directed obliquely downwardly, the image is focused at the conjugate position to the virtual image $I_1'$ and the mirror $M_1$. Note that in order to clarify the illustration, the distances from the mirror $M_1$ to the focused image $I_2'$ and to the second drum $D_2$ are depicted larger than the actual distances.

The focused image $I_2'$ has an X-axis positive direction directed to the left and a Y-axis positive direction directed rearwardly. However, since the mirror $M_2$ for reflecting light toward the second drum $D_2$ is disposed between the mirror $M_1$ and the image $I_2'$ with the reflecting surface of the mirror $M_2$ is directed obliquely upwardly, the secondary original image is finally focused on the second drum $D_2$ by the mirror $M_2$. The final image $I_3$ has an X-axis positive direction downwardly and a Y-axis positive direction rearwardly. The final image $I_3$ is an inverted image on the second drum $D_2$ but is transferred to the paper to obtain a normal image as in the original image. Again note that if the relationship of the numbers of mirrors in the first and second optical paths is an even-even or odd-odd relationship, the copied image will be a reversed image which is not acceptable. The above descriptions concern the case where the number of the first optical path mirrors is odd and the number of the second optical path mirrors is even. It is, in order to obtain a normal image, also possible to apply the same theory to the case where the number of the first optical path mirrors is even and the number of the second optical path is odd as shown in FIG. 7. The case where no mirrors are used can be dealt with as an even number case.

Figure 8:
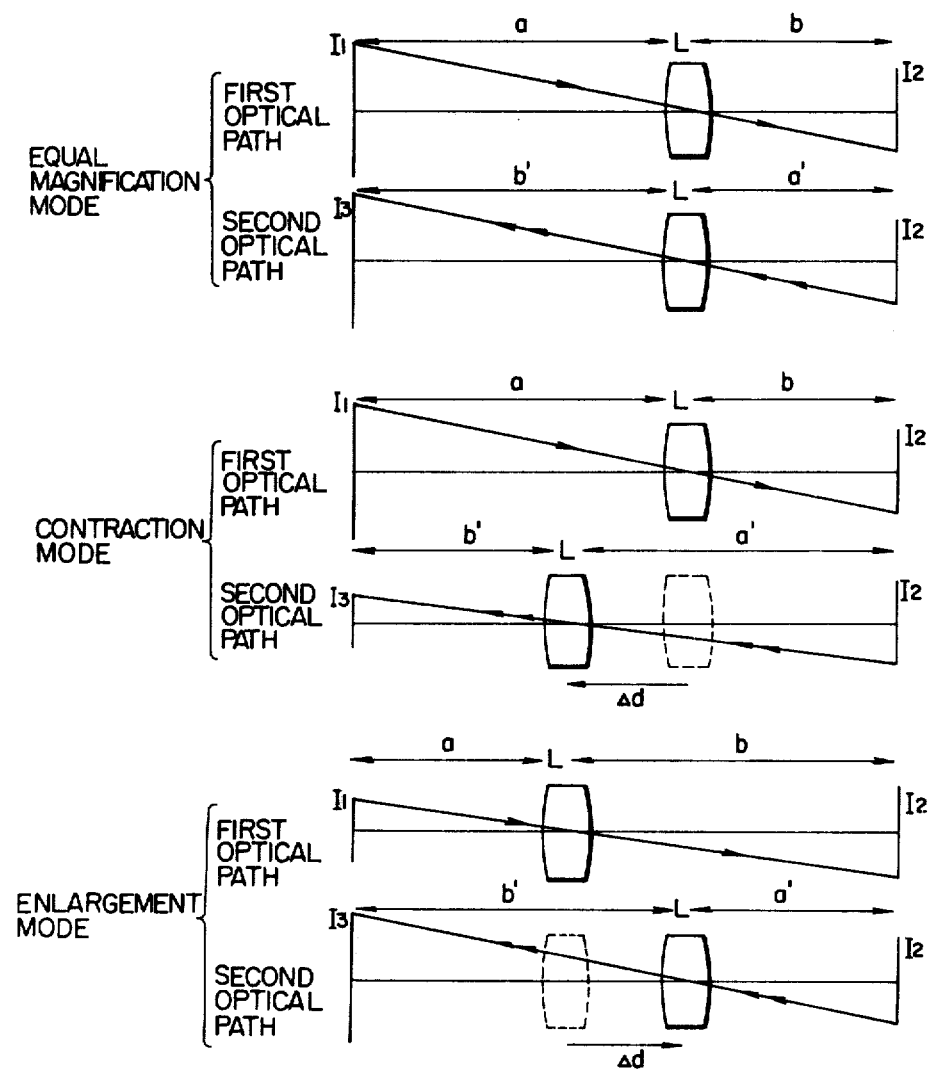
FIG. 8 is a lens position diagram illustrating equal, reduced and enlargement magnification modes.

Next, the relationship of the focusing magnification between the original image $I_1$ and the final image $I_3$, that is, the final copy reproduced image will be described with regard to equal size, reduction and enlargement magnifications referring to FIG. 8.

For the equal magnification mode, the original image $I_1$ is focused on the first drum $D_1$ by the lens L in the first optical path. If $a > b$ where a is the distance between the original image $I_1$ and the lens L and b is the distance between the lens L and the focal position on the first drum, the magnification $m_1$ of the first optical path satisfies the relationship $m_1 = b/a$ and $m_1 < 1$. This relates to a reduced image but is applicable also to an enlarged image. In this case, the diameter of the first drum $D_1$ is enlarged.

The exposed image on the first drum $D_1$ is formed as a visible image through the development process as a secondary original image $I_2$. In the second optical path from the secondary image $I_2$ to the second drum $D_2$, if $a' < b'$ and $b = a'$ where $a'$ is the distance from the secondary original image $I_2$ to the lens L and $b'$ is the distance from the lens L to the focal position of the second drum, the magnification of the second optical path satisfies the relationship $m_2 = b'/a'$ and $m_2 > 1$ which relates to enlarged magnification. The overall or resultant magnification m of the original $I_2$ and the final image $I_3$ is represented by:

$$m = m_1 \times m_2 = (b/a) \times (b'/a').$$

The lens L is commonly used in the first and second optical paths. There is a slight difference in that the advancing directions of light therein are opposite to each other. Then, since the limitation of $b = a'$ is established, the equation of $a + b = a' + b'$ is established. The magnification $m = 1$ can be obtained by substitution. This means that equal magnification can be obtained in copying. In this case, when the focusing image is transferred from the first optical path to the second optical path, it is not necessary to move the position of the lens L.

In the reduction magnification mode, the lens L is arranged in the first optical path in the same relationship as in the equal magnification mode and the reduction magnification of $m_1 = b/a$, $a > b$ and $m_1 < 1$ can be obtained. In the second optical path, the secondary original image $I_2$ reduced in the first optical path is transferred satisfying the following relationships. Namely, when $a' > b'$, $a' = a$ and $m_2 = b'/a'$. Therefore, $m_2 < 1$, $a + b = a' + b'$. This represents reduction magnification focusing. When the image is transferred from the first optical path to the second optical path, the lens L must be moved toward the second drum along the optical axis by $a - b' = \Delta d$. The resultant magnification m from the original image $I_1$ to the final image $I_3$ is represented as:

$$m = m_1 \times m_2, a > b, a = a', \text{ and } a + b = a' + b'.$$

Therefore $m = (b/a)^2$ and $m < 1$.

In the enlargement magnification mode, the lens L is arranged in the second optical path in the same relationship as in the equal magnification mode with $a' < b'$, $m_2 = b'/a' > 1$. In the first optical path, since $a < b$ and $a = a'$, $m_1 = b/a > 1$. This indicates enlargement magnification. The resultant magnification m from the original image $I_1$ to the final image $I_3$ is represented as:

$$m = m_1 \times m_2 = (b/a)^2, m > 1.$$

If the resultant magnification m is obtained in the reduction mode, since in the first and second optical paths the same magnification is used, each reduction magnification value is a square root of the total magnification m. In other words, a sufficient total magnification can be obtained with a small reduction or a small enlargement magnification in each optical path. Since each reduction of enlargement magnification is small, a short movement of the lens is required, and the distance between the object point and the image point can be relatively shortened. This leads to a compactness of the device and a facilitation of the required adjustments thereof. Furthermore, the reduction magnification is the inverse of the enlargement magnification. As apparent from FIGS. 5 and 8, with two chosen positions of the lens, the reduction or the enlargement can be freely selected by a limited movement $\Delta d$ of the lens. The construction is very simple and the manufacturing cost is accordingly reduced.

Thus, according to the present invention, the numbers of optical components and associated mechanical parts is reduced and adjustments made easy in the optical system. The total manufacturing cost is thereby reduced and a copying system of high compactness and good performance is provided.

What is claimed is:

1. A copying machine in which an original image is formed as a visible image on a first drum, said visible image is used as a secondary original image which is focused on a second drum and is transferred from said second drum to a recording sheet to thereby provide copies, a copying optical system characterized in that a single projecting lens is used commonly in a first optical path through which said original image is projected onto said first drum and in a second optical path through which said secondary original image is projected onto said second drum.

2. The copying machine as defined in claim 1 wherein an even number of mirrors is disposed up to said first drum in said first optical path and an odd number of mirrors is disposed from said first drum to said second drum in said second optical path.

3. The copying machine as defined in claim 1 wherein an odd number of mirrors is disposed up to said first drum in said first optical path and an even number of mirrors is disposed from said first drum to said second drum in said second optical path.

4. The copying machine as defined in claim 1 further comprising means for adjusting a position of said lens to vary a magnification between said original image and a final image.

5. A copying machine comprising: a transparent surface for receiving an original document to be copied; first illuminating means for illuminating said original document through said transparent surface; first and second light sensitive drums disposed below said transparent surface; a single lens disposed between said drums; a mirror rotatably mounted along one edge thereof, said mirror being swingable between a first position wherein an image of said original document is reflected through said lens to said first drum and a second position wherein an image from said first drum is focused through said lens onto said second drum; and a second illuminating means for illuminating said first drum.

6. A copying machine comprising: a transparent surface for receiving an original document to be copied; first illuminating means for illuminating said original document through said transparent surface; first and second light sensitive drums disposed below said transparent surface; a first stationary mirror; a second mirror rotatable around one end thereof; a single lens disposed between said first drum and said second mirror, said second mirror being swingable between a first position wherein an image of said original is reflected by said first mirror to said second mirror and through said lens to said first drum and to a second position wherein an image from said first drum is focused through said lens and reflected by said second mirror onto the surface of said second drum; and second illuminating means for illuminating said first drum.

7. A copying machine comprising: a transparent surface for supporting an original document to be copied; a first illuminating means for illuminating said original document through said transparent surface; a mirror-lens swingably mounted along a center line thereof; first and second light sensitive drums disposed below said transparent surface, said mirror-lens being swingable between a first position wherein an image of said original document is reflected by said mirror to said mirror-lens and onto said first drum and to a position where an image from said first drum is focused and reflected by said mirror-lens onto the surface of said second drum; and second illuminating means for illuminating said first drum.

8. A copying machine comprising: a transparent surface for supporting an original document to be copied; first illuminating means for illuminating said original document through said transparent surface; first and second drums disposed below said transparent surface; a first rotatable mirror rotatable around a center line thereof; a single lens disposed between said first mirror and said first drum; a second stationary mirror disposed to reflect light from said first mirror to the surface of said second drum, said first mirror being rotatable from a first position wherein an image of said original document is reflected by said first mirror through said lens to the surface of said first drum and to a second position wherein an image from the surface of said first drum is focused through said lens and reflected by said first mirror to said second mirror and onto the surface of said second drum; and second illuminating means for illuminating said first drum.

* * * * *